March 12, 1929.  P. W. MORRISSEY  1,705,225
COTTON HARVESTER
Filed March 30, 1927

Inventor
PATRICK W. MORRISSEY,
By James A. Walsh
Attorney

Patented Mar. 12, 1929.

1,705,225

UNITED STATES PATENT OFFICE.

PATRICK W. MORRISSEY, OF RACINE, WISCONSIN, ASSIGNOR TO J. I. CASE THRESHING MACHINE COMPANY, OF RACINE, WISCONSIN, A CORPORATION.

COTTON HARVESTER.

Application filed March 30, 1927. Serial No. 179,655.

The object of my invention is to provide a simply constructed and operable implement for harvesting cotton which in its progress through the fields has a gathering effect upon cotton plants and so draws such plants into the path of its travel that the action of its separating instrumentalities will strip or separate the bolls therefrom, convey the separated bolls to a source of deposit such as a vehicle and leave the plants standing in the field; in other words, I provide a simple machine capable of operating through a field to pick or strip cotton bolls from the plants in a rapid and efficient manner and thus dispense with the common slow methods of picking the crop by hand, as will further appear.

Figure 1:
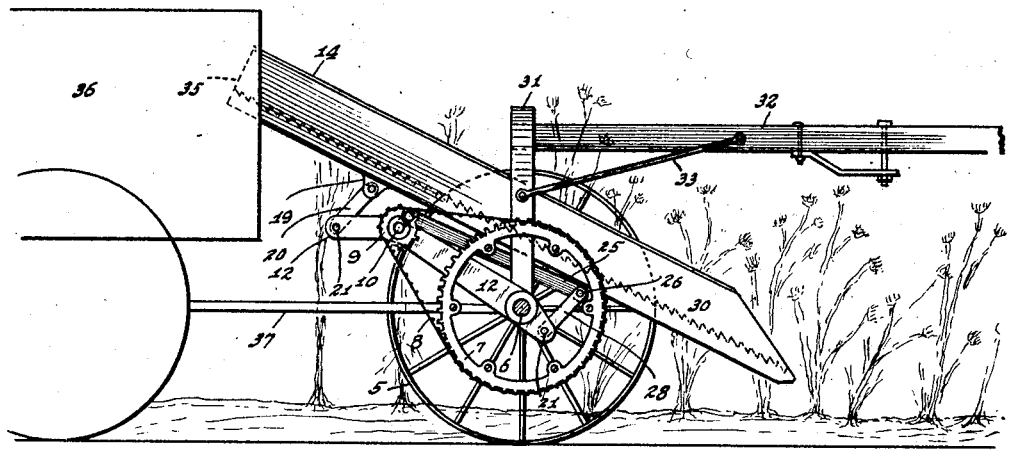
Figure 2:
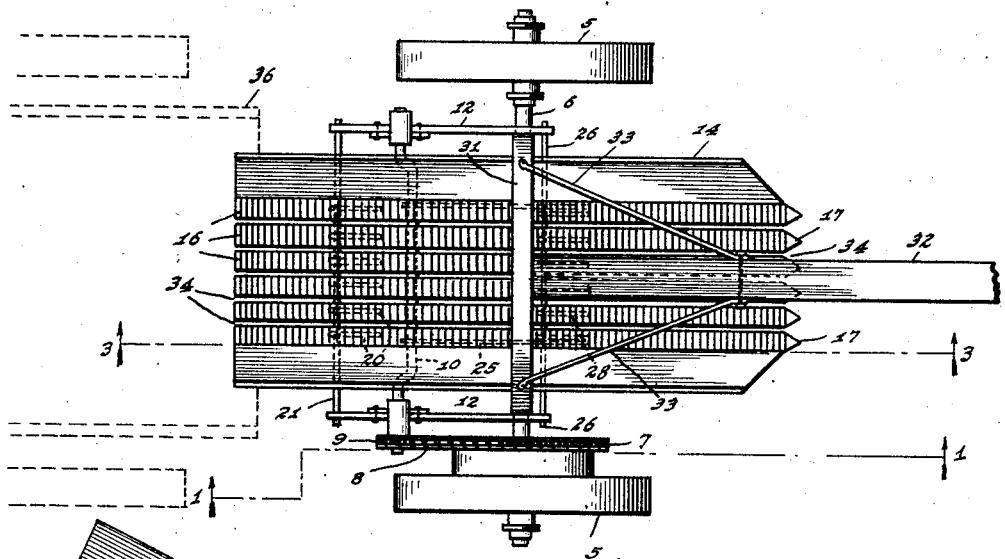
Figure 3:
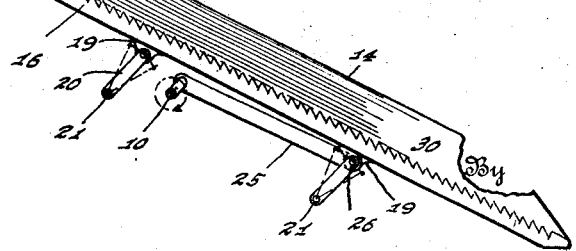

In the accompanying drawing, forming part hereof, Figure 1 is a longitudinal section of a harvester embodying my invention, taken on the dotted line 1—1 in Fig. 2; Fig. 2 is a plan; and Fig. 3 is a detail section taken on the dotted line 3—3 in Fig. 2.

In said drawing, 5 indicates the carrying wheels of the harvester, which are mounted upon an axle, 6. Also on said axle I mount a sprocket-wheel, 7, which is secured to one of the wheels 5, and which sprocket wheel is connected by a chain, 8, to a sprocket, 9, mounted on a crank-shaft, 10, the latter being supported by the axle 6 through arms, 12, connecting the crank-shaft and axle.

Upon the structure described I mount a gatherer comprising inclined side walls, 14, between which walls are provided a plurality of stripper bars, 16, having pointed ends, 17, said gatherer being supported upon the wheeled structure in the following manner. To the under side of the stripper bars hangers, 19, are secured, from which links, 20, are suspended, and the lower ends of which links are connected by a rod, 21, which rod is supported at the outer ends of the arms 12. Also, to said crank-shaft I connect pitmen 25, which are secured at their opposite ends to a forward transverse rod, 26, and to which rod 26 and the arms 12 links, 28, are connected, and by which arrangement of arms, links and pitmen the gatherer, indicated as 30, is so mounted as to be capable of recipocatory movement. The harvester may also be provided with a tongue support, which I have preferred to illustrate as a curved bar, 31, attached to each side of the axle 6, and to which a tongue or equivalent device, 32, may be attached, the latter element being desirably braced to the bar 31 by rods, 33, as indicated in Figs. 1 and 2.

It will be observed that the stripper bars 16 are of a notched or saw-tooth formation, and as the gatherer is drawn through the fields by animal or mechanical power the rotary action of the sprocket-and-chain system 7, 8, 9, caused by the rolling of the wheels 5, actuates crank-shaft 10 and its connected mechanisms to impart a reciprocatory motion to stripper-bars of the gatherer 30, and, as the stripper bars 16 advance and retract, and being in inclined position, the spaces, 34, therebetween, receive the cotton plants, with the result that as the harvester moves forwardly the plants are gathered between such spaces, the inclined stripper bars on each side thereof gradually advancing upwardly in relation to the plants and crowding the stems and leaves through the spaces, while the bolls, being too large to pass through such spaces, are pulled or stripped from the stems, and remain upon the stripper bars of the gatherer to be conveyed rearwardly therealong by the reciprocating action of the strippers until they reach the rear upper end, 35, of the gatherer from whence they may discharge into an attached vehicle, 36, or otherwise, to be conveyed to a source of deposit, and where such vehicle is employed, as indicated in Fig. 1, it may be attached to the harvester by a suitable connection, as the tongue 37, to the axle 6 or other part of the harvester. In providing a plurality of stripper bars the gathering area of the harvester is increased so that its range of operation is extended to contact with plants irregularly disposed, and as the plants are drawn between the stripper bars it will be understood that more or less of the stems, leaves and bolls are stripped from the plants to be conveyed to and discharged from the rear of the gatherer and disposed of according to practice. It will therefore be seen that in providing a machine of the character disclosed I am enabled to readily strip or remove bolls from the cotton plants in an expeditious manner and dispense with manual picking or harvesting of the cotton crop as at present commonly practiced.

I claim as my invention:

1. In a cotton harvester, a wheeled support, inclined cotton strippers spaced apart and having their lower ends traveling close to the ground, a crank-shaft, means connecting the crank-shaft to the wheeled support, means for attaching the strippers to said connecting means, pitmen connected to the crank-shaft, means connecting the pitmen to the means for connecting the crank-shaft to the wheeled support, and means for operating the crank-shaft to actuate the pitmen and thereby impart reciprocatory motion to the strippers for separating bolls from cotton plants and propelling the bolls upwardly and rearwardly and discharging the bolls.

2. In a cotton harvester, a gatherer embodying inclined stripper bars having their lower ends traveling close to the ground and adapted to pick bolls from cotton plants, a wheeled structure, arms supported on said wheeled structure, a crank-shaft mounted on said arms, a sprocket-and-chain system connecting said crank-shaft and wheeled structure and actuated by the latter, and pitmen connected to the crank-shaft and the gatherer whereby the latter is reciprocated upon the actuation of said sprocket-and-chain system to propel picked cotton bolls upwardly and rearwardly and discharge the bolls.

3. In a cotton harvester, a wheeled support, a gatherer embodying inclined strippers having their lower ends traveling close to the ground and adapted to pick bolls from cotton plants, means connecting the gatherer in inclined position in relation to the wheeled support, and means on the wheeled support for actuating said connecting means to reciprocate said strippers to propel picked cotton bolls upwardly and rearwardly and discharge the same.

4. In a cotton harvester, an axle, wheels on said axle, a sprocket secured to one of the wheels, arms connected to the axle, a crank-shaft supported by the arms, a sprocket on the crank-shaft, a chain connecting said sprockets, a gatherer, links connecting the arms to the gatherer, pitmen connected to the crank-shaft and links connected to the pitmen and to said arms and gatherer, whereby when said crank-shaft is actuated reciprocatory motion will be imparted to the gatherer.

In testimony whereof I affix my signature.

PATRICK W. MORRISSEY.